(12) United States Patent
Wang et al.

(10) Patent No.: US 11,345,047 B2
(45) Date of Patent: May 31, 2022

(54) AUTOMATED GRASPING APPARATUS AND METHOD FOR PRECISE AND CLEAN ASSEMBLY OF LARGE-APERTURE OPTICAL ELEMENT

(71) Applicant: Tsinghua University, Beijing (CN)

(72) Inventors: Hui Wang, Beijing (CN); Kai Long, Beijing (CN); Zheng Zhang, Beijing (CN); Bing Zhao, Beijing (CN); Tianye Liu, Beijing (CN); Mengjiya Tian, Beijing (CN)

( * ) Notice: Subject to any disclaimer, the term of this patent is extended or adjusted under 35 U.S.C. 154(b) by 286 days.

(21) Appl. No.: 16/629,197

(22) PCT Filed: Dec. 7, 2017

(86) PCT No.: PCT/CN2017/114996
§ 371 (c)(1),
(2) Date: Jan. 7, 2020

(87) PCT Pub. No.: WO2019/075878
PCT Pub. Date: Apr. 25, 2019

(65) Prior Publication Data
US 2021/0362352 A1    Nov. 25, 2021

(30) Foreign Application Priority Data
Oct. 17, 2017   (CN) .......................... 201710963796.4

(51) Int. Cl.
*B25J 15/06*    (2006.01)
*B25J 9/16*     (2006.01)
(Continued)

(52) U.S. Cl.
CPC ......... *B25J 15/0616* (2013.01); *B25J 9/1653* (2013.01); *B25J 9/1664* (2013.01);
(Continued)

(58) Field of Classification Search
CPC .... B25J 15/0616; B25J 15/0061; B25J 15/02; B25J 9/1653; B25J 9/1664; B25J 9/1697
See application file for complete search history.

(56) References Cited

U.S. PATENT DOCUMENTS

2019/0366556 A1* 12/2019 Wang ................... B25J 15/0293
2021/0178583 A1*  6/2021 Ye .......................... B25J 9/1664
(Continued)

FOREIGN PATENT DOCUMENTS

CN    102765092 A  * 11/2012
CN    102765092 A    11/2012
(Continued)

*Primary Examiner* — Gerald McClain
(74) *Attorney, Agent, or Firm* — Novoclaims Patent Services LLC; Mei Lin Wong

(57) ABSTRACT

An automated grasping apparatus for precise and clean assembly of a large-aperture optical element includes a reconfigurable end effector, a manipulating robot arm, a computer control unit, a task management software and process database system, a code scanning recognizer, and an electrical auxiliary support system. During an assembling operation, a code of the optical element is scanned by the code scanning recognizer, wherein a suitable process for the optical element is retrieved automatically. The configuration of the end effector is adjusted according to an instruction flow that precision grasping and stable suction of the optical element are achieved by manipulating the end effector. The robot arm is moved to place the optical element at a designated station, and the robot arm carries the end effector to return to an original position after the assembly operation is completed.

5 Claims, 2 Drawing Sheets

(51) Int. Cl.
   *B25J 15/00*   (2006.01)
   *B25J 15/02*   (2006.01)
(52) U.S. Cl.
   CPC ......... *B25J 9/1697* (2013.01); *B25J 15/0061* (2013.01); *B25J 15/02* (2013.01)

(56) References Cited

U.S. PATENT DOCUMENTS

2021/0379708 A1* 12/2021 He ........................... B23P 19/04
2021/0402618 A1* 12/2021 Wagner .................. B65B 35/18

FOREIGN PATENT DOCUMENTS

| CN | 205704236 | A |   | 11/2016 |
| CN | 205704236 | U | * | 11/2016 |
| CN | 107214723 | A | * | 9/2017 |
| CN | 107214723 | A |   | 9/2017 |

* cited by examiner

AUTOMATED GRASPING APPARATUS AND METHOD FOR PRECISE AND CLEAN ASSEMBLY OF LARGE-APERTURE OPTICAL ELEMENT

BACKGROUND OF THE PRESENT INVENTION

Field of Invention

The present invention relates a field of a precise and clean assembly, and more particularly to an automated grasping apparatus and method for a precise and clean assembly of a large-aperture optical element.

Description of Related Arts

Conventional large and complex optical systems, such as high-energy solid-state laser systems, giant telescope systems, or space observation systems, generally are composed of hundreds of thousands of large-aperture optical elements. The essential requirements of these large-aperture optical elements must be effective, clean and precise for meet the desired performance indication of the large-aperture optical elements. Considered that the technical requirements for these large and complex optical systems are extremely high and strict, the large-aperture optical elements must be assembled in a ultra-precise manner and under an extremely clean environment, so as to guarantee each of the large-aperture optical elements having an extremely clean surface.

According to a conventional assembling operation, the large-aperture optical elements are often grasped, handled and transported, and assembled manually throughout the assembling process. However, the disadvantages of the conventional assembly process are that the work efficiency is low, the assembling accuracy is inconsistent due to the intensity of the labor work, and the surface cleanliness of each optical element cannot be guaranteed. It has a significant negative impact to meet the desired performance indication for the large and complex optical systems. Therefore, there is a need to provide an automated assembly technology for the large-aperture optical element to solve the above technical problems.

SUMMARY OF THE PRESENT INVENTION

In order to solve the above problems of conventional technologies, an objective of the present invention is to provide an automated grasping apparatus and method for a precise and clean assembly of a large-aperture optical element, to meet the requirement of assembling the large-aperture optical element in a precise assembling manner and under a clean assembling environment, and automatically assembling ability, so as to adapt to quickly and efficiently grasp and transport different diameter sizes of the optical element.

In order to achieve the above objective, the present invention provides:

An automated grasping apparatus for a precise and clean assembly of a large-aperture optical element, comprising:

a reconfigurable end effector arranged for generating a vacuum suction force;

a manipulating robot arm driving the end effector to move;

a code scanning recognizer for reading specifications of the optical element;

a task management software and process database system;

an electrical auxiliary support system;

a computer control unit retrieving data from the task management software and process database system and controllably operating the end effector, the manipulating robot arm and the electrical auxiliary support system.

The end effector comprises a central spindle unit, a flange connecting disk coupled at a top side of the central spindle unit to couple with the manipulating robot arm, wherein the end effector is controllably carried by the manipulating robot arm for completing automatically grasping, transporting and assembling operations of the large-aperture optical element. The central spindle unit is coupled to a plurality of discrete members via a support rod system extended radially from the central spindle, wherein the discrete members are driven to move independently and are axially moved along the central spindle unit by the support rod system.

The central spindle unit comprises a hollow spindle, an upper retention ring, a movable ring, and a lower retention ring, wherein the upper retention ring, the movable ring and the lower retention ring are sequentially coupled at the hollow spindle from top to bottom, wherein the central spindle unit further comprises a single degree of freedom servo cylinder system coaxially provided in the hollow spindle and coupled to the movable ring, wherein the movable ring is controllably moved up and down along an axis of the hollow spindle according to an input displacement command. The support rod system comprises three rod sets, wherein a first end of each rod set is coupled to at least one of the upper retention, the movable ring and the lower retention ring.

The rod set of the support rod system is pivotally connected via a single degree of freedom pivot hinge, such that the rod set is adapted to pivotally move up and down with respect to a pivot shaft of the pivot hinge. Two rods form a pair as one rod set. A second end of the rod set is pivotally coupled to another pivot hinge of a positioning frame of each discrete member of a vacuum suction array unit.

The discrete members are divided into two operational groups, wherein the discrete members in each operational group are moved up and down synchronously. When the movable ring is moved up and down by the single-degree-of-freedom servo cylinder system, the discrete members in the two operational groups are moved asynchronously. During the operating, the discrete members are arranged for automatically grasping the optical element that the arrangement of the discrete members of the vacuum suction array unit is correspondingly changed with respect to the diameter size of the aperture of the optical element, so as to achieve the reconfigurable ability of the end effector.

In the two different operational groups, the number of the discrete members in one operational group is a while the number of the discrete members in another operational group is b, wherein a≠b.

In the vacuum suction array unit, each discrete unit comprises a positioning frame, a single degree of freedom pivot hinge provided on the positioning frame, and a plurality of small vacuum cups provided at a bottom of the position frame.

The end effector further comprises a micro video tracking system, wherein the micro video tracking system comprises four micro video acquisition units provided at four corners of the reconfigurable end effector respectively, wherein each micro video acquisition unit is arranged to capture an image of a corresponding corner area of the reconfigurable end effector in a real time manner and to transmit the captured image to the computer control unit for status analysis.

The present invention further provides an automated grasping method for precise and clean assembly of a large-aperture optical element, wherein after the optical element is delivered to a designated assembling station under a clean assembling environment, the code scanning recognizer is initially read a QR code of the optical element in order to identify specification and model of the optical element, wherein a relevant information of the specification and model is sent to the computer control unit. In response to the relevant information of the specification and model, the computer control unit is arranged to retrieve its corresponding task operation instruction set from the task management software and process database system and to execute a task instruction as follows:

Step 1: Under the task instruction of the computer control unit, controllably move the single-degree-of-freedom servo cylinder system of the end effector with a predetermined displacement according to an instruction flow to drive the vacuum suction array unit to move correspondingly, such that the configuration of the end effector is adjusted according to the diameter size of the aperture of the optical element;

Step 2: According to the instruction flow, control the manipulating robot arm to move the end effector to align and contact with the surface of the optical element, wherein at the same time, the micro video tracking system is arranged to monitor the movement of the end effector so as to ensure the accurate and safe operation thereof;

Step 3: Start operate the electrical auxiliary support system of the vacuum pump to generate a vacuum effect, wherein the vacuum suction array unit of the end effector is actuate to provide the suction force on the surface of the optical element, such that precision grasping and stable suction of the optical element are achieved by manipulating the end effector;

Step 4: According to a specified assembling route, actuate the manipulating robot arm to move the end effector correspondingly, so as to transport the optical element at a designated assembling station, wherein the transporting process is monitored by the micro video tracking system to ensure the accurate and safe assembling operation;

Step 5: After the assembling operation is completed, unload the end effector from the optical element and return the end effector back to its original position by the manipulating robot arm.

Compared with conventional technologies, the present invention has the following advantages: the automated grasping control apparatus of the present invention can significantly minimize the probability of directly contacting the surface of the optical element by the operator, and greatly improve the surface cleanliness of the large-aperture optical element after the assembling operation, so as to improve the performance of the optical system. The damage threshold for the optical element will be increased especially for the laser optical system. At the same time, the configurable design and the automated operation mode of the present invention can improve the system capability to different types of optical elements under an actual assembling environment, improve the work efficiency and improve assembling accuracy and consistency of the optical system. It is a significant improvement of the urgently needed precision clean automated assembly technology for large-caliber optical element for the development and construction of large-scale and complicated optical systems in the contemporary frontier.

DETAILED DESCRIPTION OF THE PREFERRED EMBODIMENT

The present invention will be described from the following accompanying drawings, and the specific embodiments.

Figure 1:
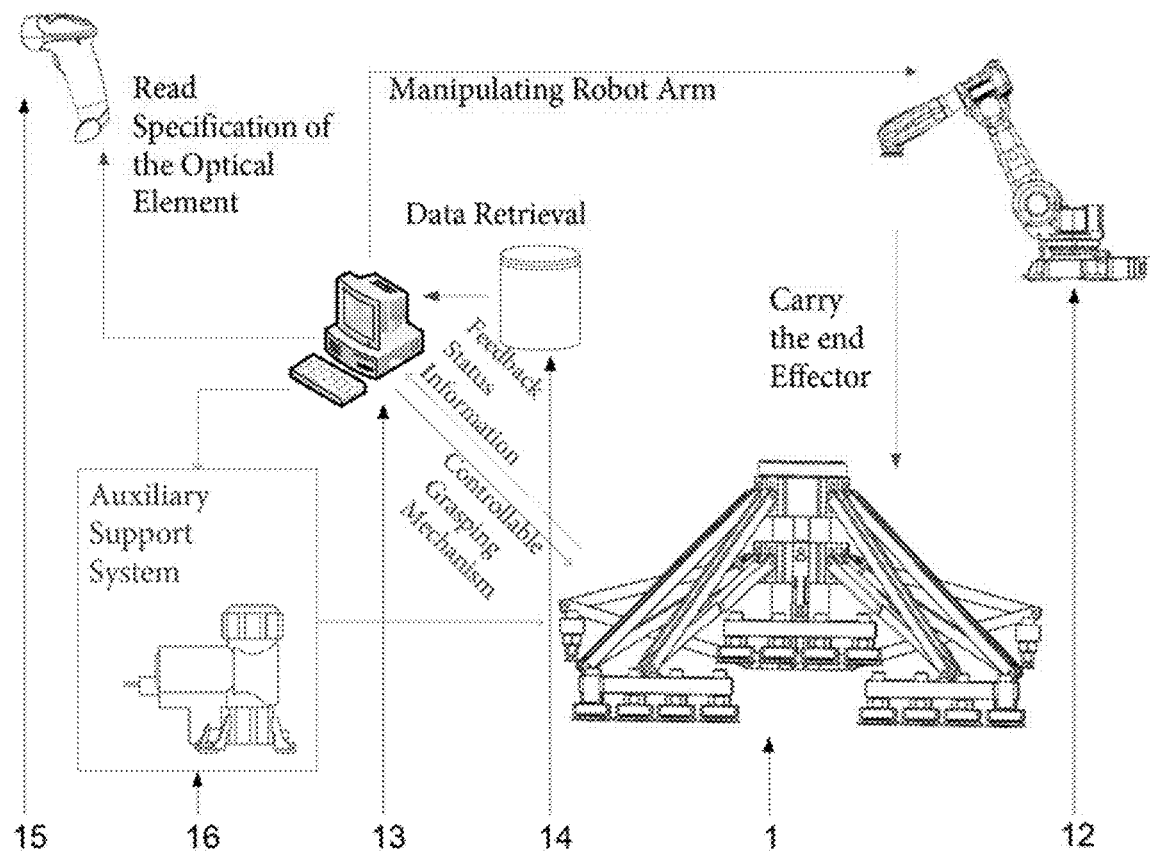
FIG. 1 is a schematic view of an automated grasping apparatus and method for a precise and clean assembly of a large-aperture optical element according to a preferred embodiment of the present invention.
Figure 2:
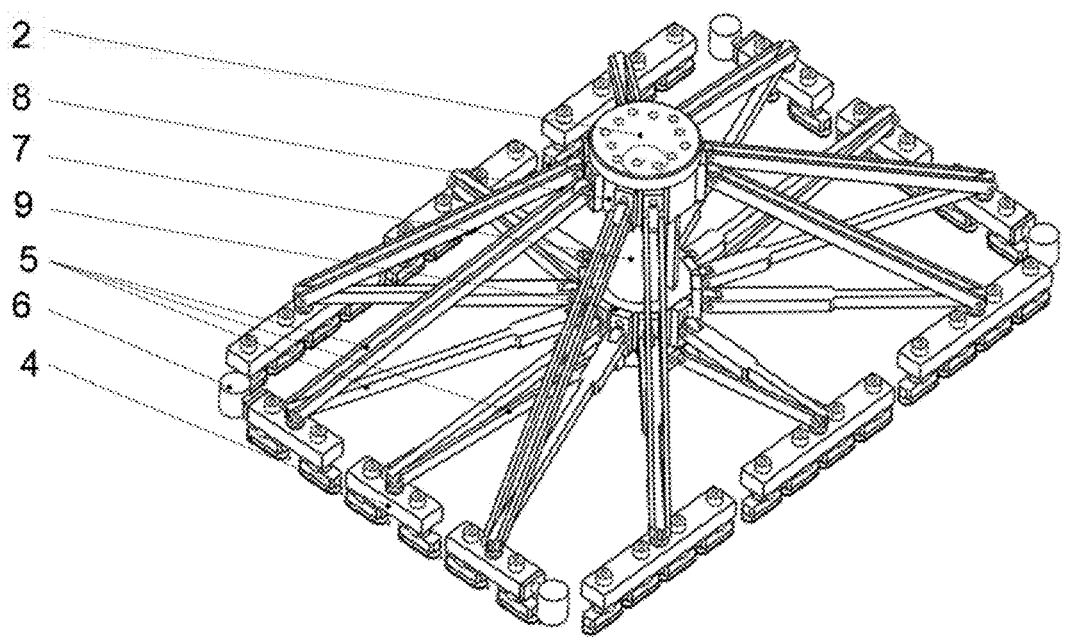
FIG. 2 is a perspective view of an end effector of the automated grasping apparatus according to the above preferred embodiment of the present invention.
Figure 3:
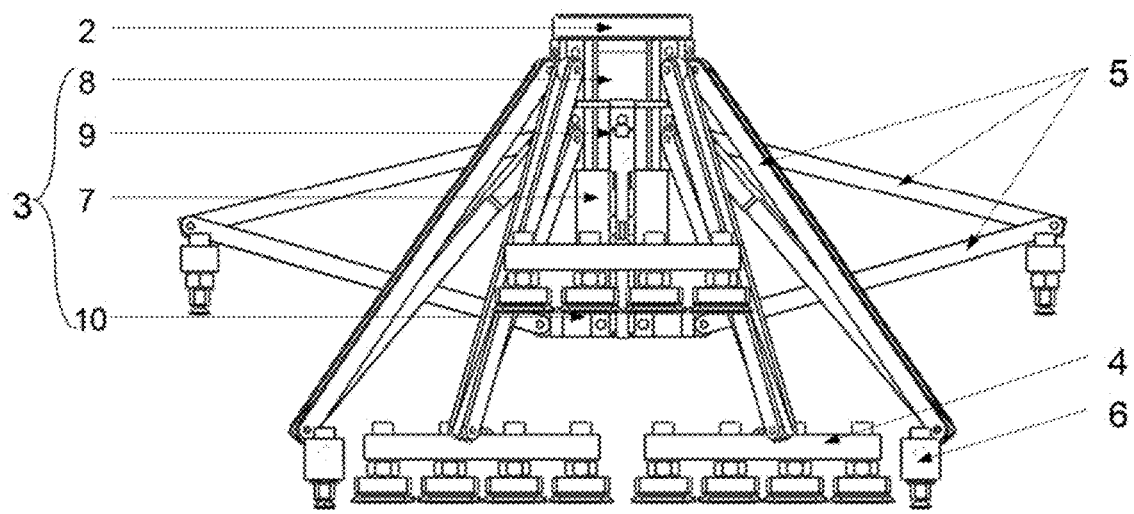
FIG. 3 illustrates a configuration of the configurable end effector of the automated grasping apparatus according to the above preferred embodiment of the present invention.
Figure 4:
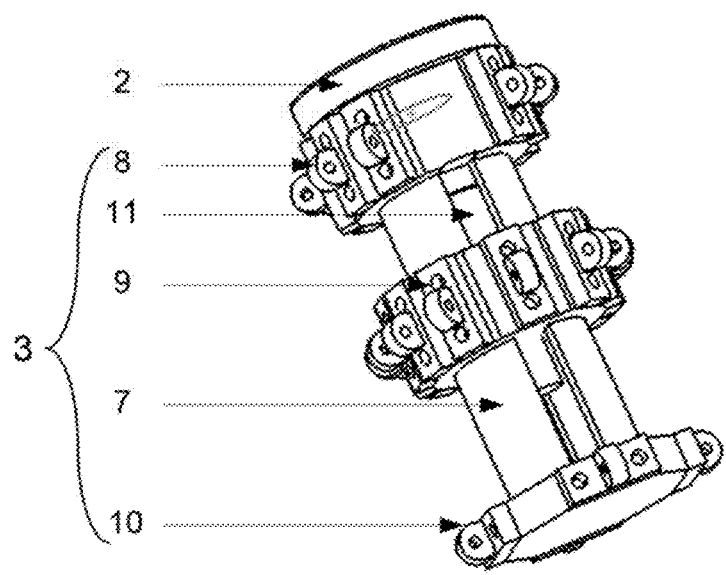
FIG. 4 is a perspective view of a central spindle unit of the end effector of the automated grasping apparatus according to the above preferred embodiment of the present invention.

As shown in FIG. 1 and FIG. 2, an automated grasping apparatus and method for precise and clean assembly of a large-aperture optical element is illustrated. The apparatus comprises a reconfigurable end effector 1, a manipulating robot arm 12, a computer control unit 13, a task management software and process database system 14, a code scanning recognizer 15, and an electrical auxiliary support system 16 of a vacuum pump.

The end effector 1, which is adopted with a vacuum suction method to generate a vacuum suction force, comprises a flange connecting disk 2, a central spindle unit 3, a support rod system 5, a vacuum suction array unit 4, and a micro video tracking system 6.

The central spindle unit 3 comprises a hollow spindle 7, an upper retention ring 8, a movable ring 9, and a lower retention ring 10. A single degree of freedom servo cylinder system 11 is coaxially provided in the hollow spindle 7 and is coupled to the movable ring 9, wherein the single degree of freedom servo cylinder system 11 is adapted to move up and down along an axis of the hollow spindle 7 according to an input displacement command.

The vacuum suction array unit 4 is the essential component of the end effector 1 to achieve the vacuum suction function. The vacuum suction array unit 4 is constructed to have a plurality of discrete members, wherein each discrete member is moved independently. Each discrete member comprises a positioning frame and a plurality of small vacuum cups provided at a bottom of the position frame, wherein a single degree of freedom pivot hinge is provided on the positioning frame.

The support rod system 5 comprises at least three rod sets, wherein a first end of the rod set are coupled at the upper retention ring 8, the movable ring 9, or the lower retention ring 10, wherein the connection is formed via a single degree of freedom pivot hinge, such that the rod set is adapted to pivotally move up and down with respect to a pivot shaft of the pivot hinge. Two rods form a pair as one rod set, wherein a second end of the rod set is coupled to the pivot hinge of the positioning frame of each discrete member. The discrete members, which can move independently, are divided into two operational groups, wherein the discrete members at each operational group are moved up and down synchronously. When the movable ring 9 is driven to move up and down along the single degree of freedom servo cylinder system 11, the operational groups will not be moved synchronously, i.e. asynchronously. During the assembling operation, the large aperture of the optical element can be attached by the vacuum suction array unit 4, wherein the arrangement of the discrete members of the vacuum suction array unit 4 can be correspondingly changed with respect to the diameter size of the aperture of the optical element, so as to achieve the reconfigurable ability of the end effector 1.

The micro video tracking system 6, which is a supplement system, comprises four micro video acquisition units provided at four corners of the reconfigurable end effector 1 respectively, wherein each micro video acquisition unit is arranged to capture an image of a corresponding corner area of the reconfigurable end effector 1 in a real time manner and to transmit the captured image to the computer control unit 13 for status analysis.

Through the flange connecting disk 2, the reconfigurable end effector 1 is able to couple to the manipulating robot arm 12, wherein the manipulating robot arm 12 is operated to drive the end effector 1 to complete the grasping, moving and assembling operations of the large-aperture optical element.

In this embodiment, the vacuum suction array unit 4 comprises twelve discrete members being moved independently. The discrete members are divided into two types, i.e. type A and type B, wherein four and two small vacuum cups are installed thereinto respectively.

The end effector 1 has a rectangular configuration, wherein the twelve discrete members are aligned and arranged in such a rectangular configuration. There are three type A discrete members along a long side of the rectangular configuration and there are three type B discrete member along a short side of the rectangular configuration.

The computer control unit 13 is an industrial personal computer system with input, output and storage abilities. A disk storage system is implemented with video surveillance software and is arranged to read the four sets of image data from the micro video acquisition units of the micro video tracking system 6 in a real time manner. At the same time, the task management software and process database system 14 is also installed in the disk storage system.

The code scanning recognizer 15 is a QR code identifier connected to the computer control unit 13. The code scanning recognizer 15 is arranged to scan a QR code provided by the optical element, and to send it to the computer control unit 13.

The computer control unit 13 is connected to the electrical auxiliary support system 16 of the vacuum pump, wherein the computer control unit 13 is arranged to control a vacuum intensity data of the vacuum pump corresponding to the diameter size of the aperture of the optical element and the weight of the optical element, so as to appropriately regulate an actual suction force of the end effector 1 to carry the optical element by means of vacuum effect.

The automated grasping method for precise and clean assembly of a large-aperture optical element is illustrated as follows:

After the optical element is delivered to a designated assembling station under a clean assembling environment, the code scanning recognizer 15 is initially read the QR code of the optical element in order to identify the specification and model of the optical element, wherein the relevant information of the specification and model is sent to the computer control unit 13.

In response to the relevant information of the specification and model, the computer control unit 13 is arranged to retrieve its corresponding task operation instruction set from the task management software and process database system 14 and to execute a task instruction.

Step 1: Under the task instruction of the computer control unit 13, controllably move the single-degree-of-freedom servo cylinder system 11 of the end effector 1 with a predetermined displacement according to an instruction flow to drive the vacuum suction array unit 4 to move correspondingly, such that the configuration of the end effector 1 is adjusted according to the diameter size of the aperture of the optical element.

Step 2: According to the instruction flow, control the manipulating robot arm 12 to move the end effector 1 to align and contact with the surface of the optical element. At the same time, the micro video tracking system 6 is arranged to monitor the movement of the end effector 1 so as to ensure the accurate and safe operation thereof.

Step 3: Start operate the electrical auxiliary support system 16 of the vacuum pump to generate a vacuum effect, wherein the vacuum suction array unit 4 of the end effector 1 is actuate to provide the suction force on the surface of the optical element, such that precision grasping and stable suction of the optical element are achieved by manipulating the end effector 1.

Step 4: According to a specified assembling route, actuate the manipulating robot arm 12 to move the end effector 1 correspondingly, so as to transport the optical element at a designated assembling station, wherein the transporting process is monitored by the micro video tracking system 6 to ensure the accurate and safe operation.

Particularly, when performing an insertion operation of the large-aperture optical element at the assembling station, the micro video tracking system 6 must monitor the four corners of the end effector 1 with predetermine gaps to the optical element, so as to prevent any collision, impact, and the like.

Step 5: After the assembling operation is completed, unload the end effector 1 from the optical element and return the end effector 1 back to its original position by the manipulating robot arm 12.

Therefore, the end effector 1 is unloaded and returned back to the original position by the manipulating robot arm 12 once the assembling operation of the optical element is completed.

What is claimed is:

1. An automated grasping apparatus for a precise and clean assembly of a large-aperture optical element, characterized in that: comprising:
   a reconfigurable end effector (1) arranged for generating a vacuum suction force;
   a manipulating robot arm (12) driving said end effector (1) to move;
   a code scanning recognizer (15) for reading specifications of the optical element;
   a task management software and process database system (14);
   an electrical auxiliary support system (16); and
   a computer control unit (13) retrieving data from said task management software and process database system (14) and controllably operating said end effector (1), said manipulating robot arm (12) and said electrical auxiliary support system (16),
   said end effector (1) comprises a central spindle unit (3), a flange connecting disk (2) coupled at a top side of said central spindle unit (3) to couple with said manipulating robot arm (12), a vacuum suction array unit (4) comprising a plurality of discrete members being moved independently, and a support rod system (5) radially extended from said central spindle unit (3) to said discrete members, wherein said discrete members are driven to move independently and are axially moved along said central spindle unit (3) by said support rod system (5), said central spindle unit (3) comprises a hollow spindle (7), an upper retention ring (8), a movable ring (9), a lower retention ring (10), and a single degree of freedom servo cylinder system (11) wherein said upper retention ring (8), said movable ring (9) and said lower retention ring (10) are sequentially coupled at said hollow spindle (7) from top to bottom, wherein single degree of freedom servo cylinder system (11) is coaxially provided in said hollow spindle (7) and is coupled to said movable ring (9), wherein said movable ring (9) is controllably moved up and down along an axis of said hollow spindle (7) according to an input displacement command, wherein said support rod system (5) comprises three rod sets, wherein a first end of each of said rod sets is coupled to at least one of said upper retention ring (8), said movable ring (9) and said lower retention ring (10), said rod set of said support rod system (5) is pivotally connected via a single degree of freedom pivot hinge, such that said rod set is adapted to pivotally move up and down with respect to a pivot shaft of said pivot hinge, wherein two rods form a pair as on said rod set, wherein a second end of said rod set is pivotally coupled to another pivot hinge of a positioning frame of each said discrete member of said vacuum suction array unit (4), said discrete members of said vacuum suction array unit (4) are divided into two operational groups, wherein said discrete members in each operational group are moved up and down synchronously, wherein when said movable ring (9) is moved up and down by said single-degree-of-freedom servo cylinder system (11), said discrete members in said two operational groups are moved asynchronously, during an operating, said discrete members are arranged for automatically grasping the optical element that an arrangement of said discrete members of said vacuum suction array unit (4) is correspondingly changed with respect to a diameter size of an aperture of the optical element, so as to achieve the reconfigurable ability of said end effector (1).

2. The automated grasping apparatus for a precise and clean assembly of a large-aperture optical element, as recited in claim 1, characterized in that: in said vacuum suction array unit (4), each said discrete unit comprises said positioning frame, said single degree of freedom pivot hinge provided on said positioning frame, and a plurality of small vacuum cups provided at a bottom of said position frame.

3. The automated grasping apparatus for a precise and clean assembly of a large-aperture optical element, as recited in claim 2, characterized in that: in said two operational groups, a number of said discrete members in one said operational group is a while a number of said discrete members in another said operational group is b, wherein a≠b.

4. The automated grasping apparatus for a precise and clean assembly of a large-aperture optical element, as recited in claim 1, characterized in that: said end effector (1) further comprises a micro video tracking system (6), wherein said micro video tracking system (6) comprises four micro video acquisition units provided at four corners of said reconfigurable end effector (1) respectively, wherein each said micro video acquisition unit is arranged to capture an image of a corresponding corner area of said reconfigurable end effector (1) in a real time manner and to transmit a captured image to said computer control unit (13) for status analysis.

5. An automated grasping method based on the automated grasping apparatus for a precise and clean assembly of a large-aperture optical element as recited in claim 1, wherein after the optical element is delivered to a designated assembling station under a clean assembling environment, said code scanning recognizer (15) is arranged for initially reading a QR code of the optical element in order to identify specification and model of the optical element, wherein a relevant information of the specification and model is sent to said computer control unit (13), wherein in response to said relevant information of the specification and model, said computer control unit (13) is arranged to retrieve its corresponding task operation instruction set from said task management software and process database system (14) and to execute a task instruction which comprises the steps of:

Step 1: under said task instruction of said computer control unit (13), controllably moving said single-degree-of-freedom servo cylinder system (11) of said end effector (1) with a predetermined displacement according to an instruction flow to drive said vacuum suction array unit (4) to move correspondingly, such that a configuration of said end effector (1) is adjusted according to a diameter size of an aperture of the optical element;

Step 2: according to said instruction flow, controlling said manipulating robot arm (12) to move said end effector (1) to align and contact with a surface of the optical element, wherein at the same time, said micro video tracking system (6) is arranged to monitor a movement of said end effector (1) so as to ensure an accurate and safe operation thereof;

Step 3: start operating said electrical auxiliary support system (16) to generate a vacuum effect, wherein said vacuum suction array unit (4) of said end effector (1) is actuate to provide the suction force on the surface of the optical element, such that precision grasping and stable suction of the optical element are achieved by manipulating said end effector (1);

Step 4: according to a specified assembling route, actuating said manipulating robot arm (12) to move said end effector (1) correspondingly, so as to transport the optical element at a designated assembling station, wherein a transporting process thereof is monitored by said micro video tracking system (6) to ensure the accurate and safe assembling operation; and Step 5: after the assembling operation is completed, unloading said end effector (1) from the optical element and returning said end effector (1) back to its original position by said manipulating robot arm (12).

\* \* \* \* \*